(No Model.)
C. S. ALDEN.
COMBINED CIGAR CUTTER AND MATCH BOX.
No. 334,405. Patented Jan. 19, 1886.
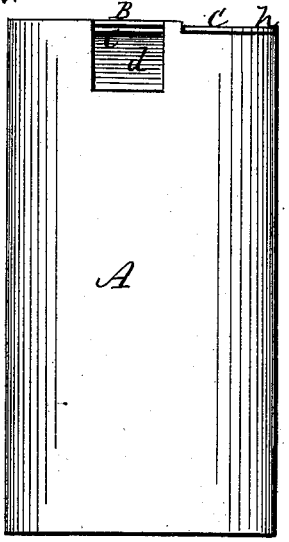
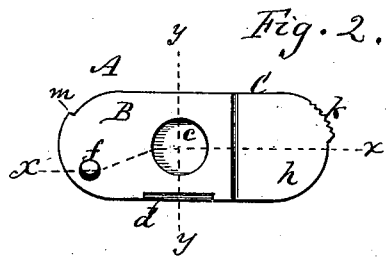
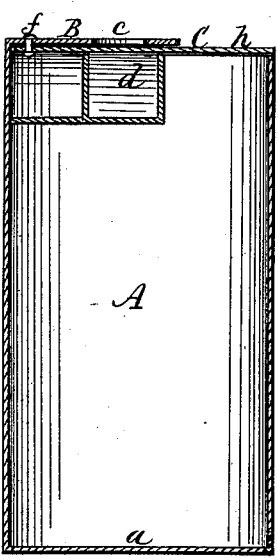
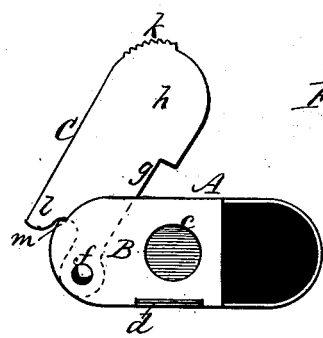
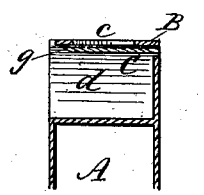
Attest.
P. H. Tieh
E. N. Adams
Inventor.
Chas. S. Alden
per R. F. Osgood,
Atty.

UNITED STATES PATENT OFFICE.

CHARLES S. ALDEN, OF ROCHESTER, NEW YORK.

COMBINED CIGAR-CUTTER AND MATCH-BOX.

SPECIFICATION forming part of Letters Patent No. 334,405, dated January 19, 1886.

Application filed October 19, 1885. Serial No. 180,260. (No model.)

*To all whom it may concern:*

Be it known that I, CHARLES S. ALDEN, of the city of Rochester, in the county of Monroe and State of New York, have invented a certain new and useful Improvement in Combined Match-Boxes and Cigar-Tip Cutters; and I do hereby declare that the following is a full, clear, and exact description of the same, reference being had to the drawings accompanying this application.

My invention consists of a box for holding matches, a permanent cover covering one-half of the top of the box, and provided with a hole to receive the tip of a cigar, a chamber beneath the hole, which opens out through the side of the box to discharge the cut tip, and a cutter pivoted on the under side of the cover to cut the tip, said cutter provided with an extension which, when closed, covers the remainder of the top of the box, all as hereinafter described.

In the drawings, Figure 1 is a side elevation of the device. Fig. 2 is a plan view of the same with the cutter closed over the top of the box. Fig. 3 is a longitudinal vertical section in line *x x* of Fig. 2. Fig. 4 is a plan view similar to Fig. 2, but showing the cutter thrown open. Fig. 5 is a vertical cross-section of the top of the box in line *y y* of Fig. 2.

A shows the box, which is of ordinary construction, having a closed bottom, *a*, and a fixed half-cover, B, that covers one-half the top of the box, the other half of the top being open for the purpose of inserting and removing the matches. In this permanent cover is made a circular hole, *c*, of sufficient size to receive the tip of a cigar to be cut off. Under this permanent cover is a box or chamber, *d*, which opens out through the side of the box on one side, by which means the tips of the cigars will fall out as fast as cut off, and will not go into the box.

C is a cutter, pivoted at *f* on the under side of the permanent cover, and running in a slot between the cover and the top of the box. The cutter is provided with a sharp cutting-edge, *g*, that comes in line with the hole *c*, by which means the cigar-tip is cut off when the cutter is closed. The cover is also provided with an extension, *h*, of the same size and shape as the opening in the top of the box, by which means it forms a cover to the said opening when the cutter is closed. The end of this extension is slightly offset, and is milled to form a finger-hold to open the cutter, as shown at *k*. At the opposite or rear end the cutter has a shoulder, *l*, which, when the cutter is opened to the fullest extent, strikes a stop, *m*, of the top of the box, thus gaging the opening of the cutter.

By the construction above described the matches can be inserted and removed through that portion of the top of the box that is open, and the whole box can be filled under the discharge-chamber *d*, while the hole in the permanent cover allows a cigar-tip to be inserted and cut off by the cutter and discharged through the side passage without interfering with the matches.

Having described my invention, what I claim as new, and desire to secure by Letters Patent, is—

The box for holding matches, the permanent cover attached to the box, covering one-half of its top and provided with a hole for the insertion of the tip of a cigar, the chamber under the hole, opening through the side of the box for discharging the cut tip, and the cutter pivoted on the under side of the cover for cutting the tip and provided with an extension which, when the cutter is closed, covers the remainder of the top of the box, the whole constructed to operate in the manner and for the purpose specified.

In witness whereof I have hereunto signed my name in the presence of two subscribing witnesses.

C. S. ALDEN.

Witnesses:
  E. STARING,
  R. F. OSGOOD.